United States Patent
Reynolds et al.

(10) Patent No.: US 12,326,722 B2
(45) Date of Patent: Jun. 10, 2025

(54) DATA PIPELINE SECURITY MODEL

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 359 days.

(21) Appl. No.: 17/862,898

(22) Filed: Jul. 12, 2022

(65) Prior Publication Data

US 2024/0019853 A1 Jan. 18, 2024

(51) Int. Cl.
*G05B 19/418* (2006.01)

(52) U.S. Cl.
CPC ..... *G05B 19/4185* (2013.01); *G05B 19/4183* (2013.01)

(58) Field of Classification Search
None
See application file for complete search history.

(56) References Cited

U.S. PATENT DOCUMENTS

| | | | |
|---|---|---|---|
| 2015/0261542 A1* | 9/2015 | Caulfield | G06F 9/3875 712/234 |
| 2018/0159879 A1* | 6/2018 | Mestha | G06N 3/084 |
| 2018/0176205 A1* | 6/2018 | Oberheide | H04L 61/4511 |
| 2018/0248903 A1* | 8/2018 | Villella | G06N 20/00 |
| 2019/0180030 A1* | 6/2019 | Wei | G06F 21/563 |
| 2019/0188065 A1* | 6/2019 | Anghel | G06F 11/0778 |
| 2021/0248144 A1* | 8/2021 | Haile | H04L 43/16 |

FOREIGN PATENT DOCUMENTS

WO WO-2022115419 A1 * 6/2022

OTHER PUBLICATIONS

Harer et al, "Automated software vulnerability detection with machine learning", Aug. 2018, pp. 1-8 (Year: 2018).*
Papernot et al, "SoK: Security and Privacy in Machine Learning", 2018, 2018 IEEE European Symposium on Security and Privacy, pp. 1-16 (Year: 2018).*

(Continued)

*Primary Examiner* — David Earl Ogg

(57) ABSTRACT

Various embodiments of the present technology generally relate to industrial automation environments. More specifically, embodiments include systems and methods to detect malicious behavior in an industrial automation environment. In some examples, a security component generates feature vectors that represents inputs and outputs to a data pipeline and supplies the feature vectors to a machine learning engine. The security component processes a machine learning output that indicates when anomalous behavior is detected in the operations of the data pipeline. When anomalous behavior is detected in the operations of the data pipeline, the security component generates and transfers an alert that characterizes the anomalous behavior.

20 Claims, 7 Drawing Sheets

(56) References Cited

OTHER PUBLICATIONS

Zolanvari et al, "Machine Learning-Based Network Vulnerability Analysis of Industrial Internet of Things", Aug. 2019, IEEE Internet of Things Journal, vol. 6, No. 4, pp. 1-13 (Year: 2019).*

Gronat et al, "MaxNet: Neural network architecture for continuous detection of malicious activity", 2019, 2019 IEEE Security and Privacy Workshops, pp. 1-8 (Year: 2019).*

Extended European Search Report for EP Application No. 23184664.3, mailed Nov. 15, 2023; 7 pages.

* cited by examiner

DATA PIPELINE SECURITY MODEL

TECHNICAL FIELD

Various implementations disclosed herein relate to industrial automation technology, and more specifically, to anomaly detection in industrial automation environments.

BACKGROUND

In industrial automation environments, control systems are used to drive various operations along an industrial line. Control programs are developed by programmers and comprise a set of program tags to carry out an industrial operation. The program tags comprise chunks of the control code and correspond to industrial assets, devices, and sensors. Control code is used by control systems like Programmable Logic Controllers (PLCs) to drive the industrial assets, devices, and sensors in an industrial process. The industrial assets, devices, and sensors in the industrial process generate operational data in response to the control code. The PLCs communicate the operational data to other systems in the industrial automation environment like machine learning assets through data processing and transfer systems like data pipelines. The data pipelines typically service a large number of industrial assets within the industrial manufacturing environments. The numerous and diverse communication connections create security vulnerabilities in the data pipelines.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. Unfortunately, industrial manufacturing environments do not effectively and efficiently utilize machine learning functionality to combat the security vulnerabilities in data pipelines.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to detect malicious behavior in an industrial automation environment. In some examples, the system comprises a security component. The security component generates feature vectors that represent the inputs and outputs of a data pipeline and supplies the feature vectors to a machine learning engine. The security component processes a machine learning output that indicates when anomalous behavior is detected in the operations of the data pipeline. When anomalous behavior is detected in the operations of the data pipeline, the security component generates and transfers an alert that characterizes the anomalous behavior.

Some embodiments comprise methods to detect malicious behavior in an industrial automation environment. The method entails generating, by a system comprising a processor, feature vectors that represent the inputs and outputs to a data pipeline and supplying the feature vectors to a machine learning engine. The method continues by processing, by the system, a machine learning output that indicates when anomalous behavior is detected in the operations of the data pipeline. When anomalous behavior is detected in the operations of the data pipeline, the method continues with generating and transferring, by the system, an alert that characterizes the anomalous behavior.

Some embodiments comprise a non-transitory computer-readable medium stored thereon instructions to detect malicious behavior in an industrial automation environment. The instructions, in response to execution, cause a system comprising a processor to perform operations. In some examples, the operations comprise generating feature vectors that represent operations inputs and outputs to a data pipeline and supplying the feature vectors to a machine learning engine. The operations further comprise processing a machine learning output that indicates when anomalous behavior is detected in the operations of the data pipeline. When anomalous behavior is detected in the operations of the data pipeline, the operations further comprise generating and transferring an alert that characterizes the anomalous behavior.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
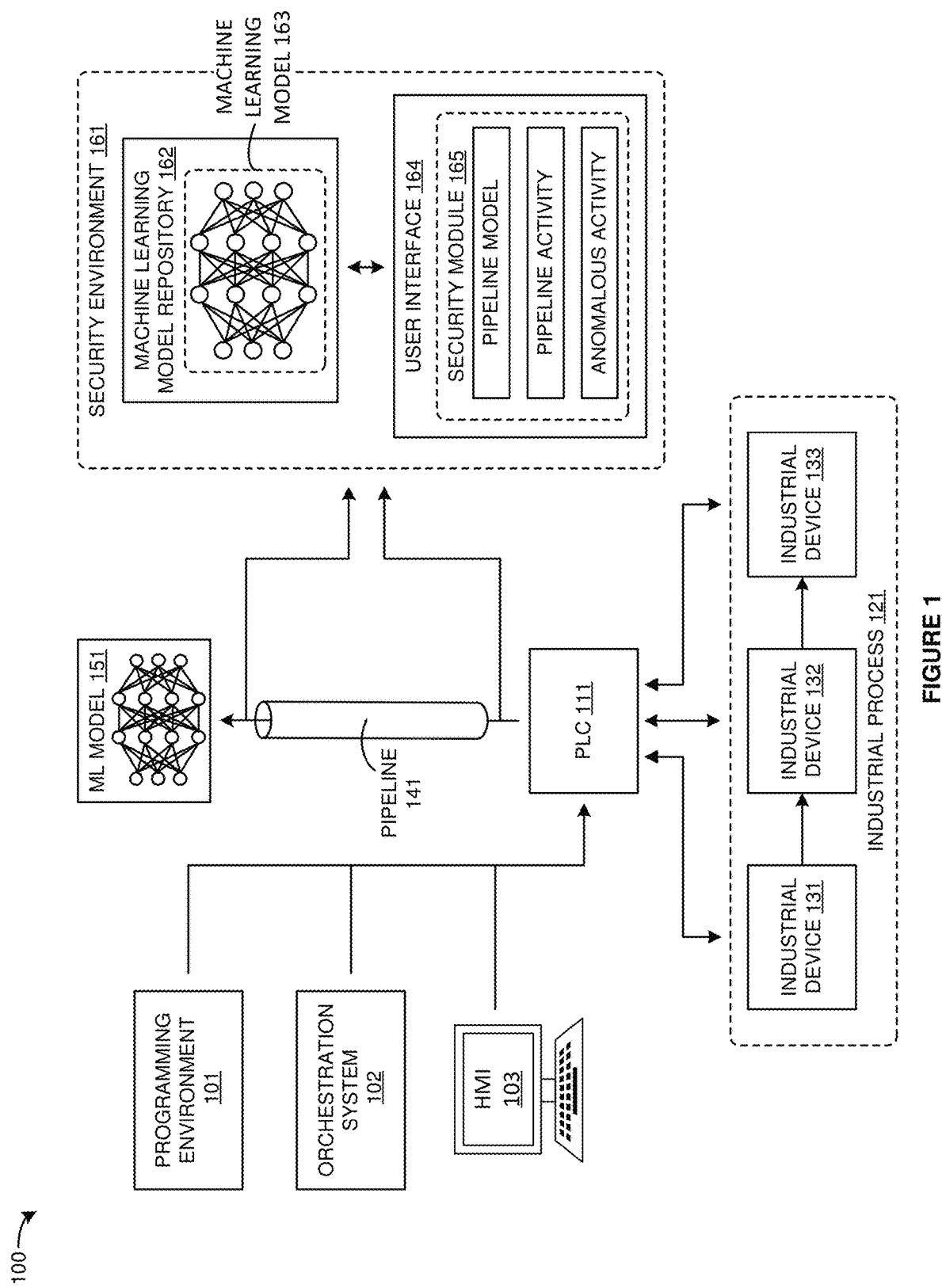
FIG. 1 illustrates an exemplary industrial automation environment to detect malicious behavior in a data pipeline of the industrial automation environment.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for data pipeline security in industrial automation environments. More specifically, embodiments of the present technology include systems and methods for utilizing machine learning systems to detect and prevent anomalous or malicious behavior in data pipelines and their associated systems. In some embodiments, Programmable Logic Controllers (PLCs) receive and execute industrial control programs that comprise instructions for controlling and performing certain operations within an industrial environment. The PLCs generate control signaling based on the execution of the control program and transfer the control signaling to control downstream devices, machinery, and automated processes. The down stream devices generate operational data and report the operational data back to the PLCs. The PLCs report the operational data to other systems in the industrial environment through data pipelines. Generally, data pipelines comprises comprise a set of data processing systems arranged in series that intake input data, execute some type of processing on the data, and generate output data.

The present technology serves to enhance industrial control by enabling the use of machine learning models to reduce security vulnerabilities in data pipelines. Industrial automation environments often fail to effectively integrate machine learning models into security systems in industrial automation environments. In an implementation of the present technology, machine learning models may be made available to operators in an industrial security environment. Security environments allow a plant operator to review the operating states of systems within the industrial automation environment to determine when systems deviate from their normal operating states.

In some embodiments, machine learning models may be connected with other elements within the industrial automation environment like data pipelines. In an embodiment, a data pipeline may report its operating state to a machine learning model. The operating state may comprise the inputs received by the pipeline, data processing steps executed by the data pipeline, and outputs generated by the pipeline. In response, the machine learning model may generate machine learning outputs when the data pipeline deviates from its normal operating behavior. For example, the machine learning model may create a statistical model that represents the data pipeline. The machine learning model may compare operational metrics reported by the data pipeline with the statistical model representing the data pipeline to identify any anomalous or malicious behavior in the data pipeline.

A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include neural network auto encoders, and unsupervised anomaly detection algorithms. Other examples of machine learning algorithms include artificial neural networks, nearest neighbor methods, ensemble random forests, support vector machines, naïve Bayes methods, linear regressions, or similar machine learning techniques or combinations thereof capable of predicting output based on input data. Machine learning models may be deployed on premises in an industrial automation environment or off-site. For example, the machine learning model may be implemented in a security environment and have a live connection with a data pipeline's Application Programming Interface (API) configured to receive inputs for a data pipeline.

To accompany the use of security system machine learning models, corresponding faceplates, displays, Graphical User Interfaces (GUIs), and the like are contemplated herein to provide intuitive representations and interfaces to for detecting anomalous and malicious behavior in data pipelines. A GUI may comprise basic controls and/or visuals relevant to identifying, and responding to, anomalous or malicious behavior detected in data pipelines. In this manner, machine learning can be brought into the security environment. For example, a security operator may interact with a GUI to perform a task such as reviewing machine learning anomaly predictions and generating commands to respond to the detected anomalies. The GUI may also be useful for performing tasks such as training models, offsetting model parameters, tuning parameters of the model, generating statistical representations of data pipelines, providing inputs, or overriding the model.

Now referring to the Figures, FIG. 1 illustrates industrial automation environment 100 to detect malicious behavior in a data pipeline. Industrial automation environment 100 performs services like factory automation, factory control, machine control, smart manufacturing, machine communication and organization, and the like. Industrial automation environment 100 comprises programming environment 101, orchestration system 102, Human Machine Interface (HMI) 103, Programmable Logic Controller (PLC) 111, industrial process 121, industrial devices 131-133, data pipeline 141, machine learning (ML) model 151, and security environment 161. Security environment 161 comprises machine learning model repository 162, machine learning model 163, user interface 164, and security module 165. In other examples, industrial automation environment 100 may include fewer or additional components than those illustrated in FIG. 1. Likewise, the illustrated components of industrial automation environment 100 may include fewer or additional components, assets, or connections than shown. Each of programming environment 101, orchestration system 102, HMI 103, PLC 111, model 151, repository 162, and user interface 164 may be representative of a single computing apparatus or multiple computing apparatuses.

Programming environment 101 is representative of one or more computing apparatuses configured to host an integrated design application to generate control programs to implement industrial process 121. It should be appreciated that the specific number of applications/modules hosted by the computing devices of programming environment 101 is not limited. Exemplary integrated design applications comprise Studio 5000® and the like. The control programs generated in programming environment 101 comprise machine instructions that direct the operations of industrial devices 131-133 in response to execution by PLC 111 to implement industrial process 121. The control programs may comprise functional block diagrams, ladder logic programs, or some other type of machine instructions. Programming environment 101 may transfer control program for delivery to PLC 111 to implement and control the industrial process 121. Programming environment 101 may comprise user interface systems that allow programmers or other types of human operators to interact with the integrated design application to generate control programs. Programming environment 101 may comprise transceiver systems that allow the integrated design application to upload the control programs to PLC 111.

Orchestration system 102 is representative of one or more computing apparatuses configured to host a factory management application to oversee the operations of PLC 111. It should be appreciated that the specific number of applications/modules hosted by the computing devices of orchestration environment 102 is not limited. Exemplary factory management applications comprise Pavilion8® and the like. The factory management application hosted by orchestration system 102 provides an intelligence layer on top of PLC 111 to control and coordinate the operation of PLC 111. For example, orchestration system 102 may direct PLC 111 when to execute a control program generated by programming environment 101 and model the automated control operations used by PLC 111 to control industrial devices 131-133. Orchestration system 102 may comprise user interface systems that allow operators or other types of human operators to interact with the factory management application to assess the control operations of PLC 111. Orchestration system 102 may comprise transceiver systems that allow the factory management application to exchange control data with PLC 111.

HMI 103 is representative of a user interface computing system that allows factory operators to view and affect the operations of PLC 111. The user interface computing system of HMI 103 is configured to host an application(s) to visualize the operations of and provide user feedback for PLC 111. HMI 103 comprises one or more user interface components like displays, kiosks, keyboards, touchscreens, tablet devices, and the like. The user interface components display environment view of industrial automation environment 100, specifically. The one or more user interface components of HMI 103 comprises a GUI that allows an operator to interact with the application(s) hosted by computing device 102, including the application(s) to view the operations of, and provide user feedback to, PLC 111.

PLC 111 comprises one or more computing devices configured to implement control programs generated in programming environment 101 to control industrial process 121. For example, PLC 111 may receive and execute a ladder logic control program received from programming environment 101 and responsively transfer corresponding control signaling to industrial devices 131-133. PLC 111 may additionally receive inputs from orchestration system 102 and HMI 103 that affect the operations of PLC 111. For example, PLC 111 may receive an input from orchestration system 102 to slow operations to coordinate PLC 111 with other PLCs in industrial automation environment 100. In some examples, PLC 111 reports operational data to machine learning model 151 to generate machine learning feedback for industrial process 121. In some examples, PLC 111 reports operational data to security environment 161. The operational data indicates the inputs/requests sent by PLC 111 to data pipeline 141 for delivery to machine learning model 151.

Industrial process 121 is representative of a manufacturing, chemical production, food processing, or any other type of industrial process. Industrial devices 131-133 are representative of machines configured to carry out industrial process 121. Industrial devices 131-133 are representative of pumps, motors, heat exchanges, reactors, food processing systems, or any other type of industrial device. Typically, the type of machines represented by industrial devices 131-133 depend in part on the type of process that industrial process 121 is representative of. Industrial devices 131-133 receive control signaling generated by PLC 111 in response to executing a control program generated in programming environment 101. Industrial devices 131-133 operate in response to the control signaling to implement industrial process 121. The control signaling drives actuators in industrial devices 131-133 that dictate the operations of industrial devices 131-133. For example, the control signaling may correspond to an actuator setting that sets a motor speed in industrial device 141 to a desired value. In other examples, the control signaling may correspond to an actuator setting that sets a pump valve to an open position. It should be appreciated that the type of operations performed by industrial devices 131-133 depends in part on their type on the process type of industrial process 121.

Data pipeline 141 is representative of a data transfer system that communicatively couples PLC 111 with machine learning model 151. For example, data pipeline 141 may be coupled to PLC 111 to transfer process data generated by industrial devices 131-131 for delivery to machine learning model 151. Data pipeline 141 comprises a set data processing elements connected in series. Data pipeline 141 may perform processing operations on the ingested data to format the data for delivery to machine learning model 151. For example, data pipeline 141 may ingest operational data generated by devices 131-133, implement a feature extraction process to generate feature vectors that represent the operational data, and transfer the feature vectors to machine learning model 151. Data pipeline 141 may comprise one or more Application Programming Interfaces) APIs to facilitate communication and data ingestion with external systems. For example, PLC 111 may call the API of data pipeline 141 to ingest operational data for process 121. In some examples, pipeline 141 transfers data inputs received from PLC 111, and data outputs generated by pipeline 141 to security environment 161 to detect malicious or anomalous activity in pipeline 141.

Machine learning model 151 is representative of a data science computing system to generate machine learning feedback for use within environment 100 and is representative of any machine learning model implemented within industrial automation environment 100 as described herein. For example, machine learning model 151 may be configured to determine correlations between different program tags that represent the various processes and variables industrial process 121 and report the correlations to programming environment 101. Machine learning model 151 may receive process data generated in industrial process 121 over data pipeline 141. Machine learning model 151 may ingest the process data and a generate a machine learning output that comprises optimizations, predictions, warnings, or other types of outputs to affect industrial process 121. In some examples, machine learning model 151 transfers data pipeline outputs to security environment 161 to detect and prevent malicious and anomalous behavior in data pipeline 141.

Security environment 161 is representative of one or more computing devices configured to host machine learning models and security applications to detect anomalous and malicious behavior in data pipeline 141. Security environment 161 comprises machine learning model repository 162. Machine learning model repository 162 is representative of one or more computing devices configured to host machine learning model 163. For example, repository 162 may comprise an application specific circuit configured to implement a machine learning model. Machine learning model 163 comprises any machine learning models implemented within industrial automation environment 100 as described herein. Machine learning model 163 is configured to ingest data that depicts the inputs, outputs, and operations of data pipeline 141 and generate machine learning outputs that indicate when data pipeline 141 deviates from a normal operating behavior. For example, machine learning model 163 may generate an output that indicates an API of data pipeline 141 was called by an unknown Internet Protocol (IP) address. For example, machine learning model 163 may generate an output that indicates pipeline 141 emitted an unusual data output based on the inputs ingested by pipeline 141. The inputs to model 163 may comprise feature vectors representing data depicting the inputs, outputs, and operations of pipeline 141. Model 163 may be trained using feature vectors that represent a normal operating mode for pipeline 141 and can use its trained machine learning to distinguish normal and abnormal operations of data pipeline 141.

Model repository 162 is coupled to user interface 164. User interface 164 comprises displays, keyboards, touchscreens, tablet devices, mobile user equipment, and the like. User interface 164 displays a GUI that allows a user to interact with security module 165 and machine learning model 163. For example, a user may interact with the GUI to receive an alert that machine learning model 163 detected a malicious actor accessing the API of pipeline 141. User interface 164 is configured to display security module 165. Security module 165 is representative of a security application that allows a user to assess security state and identify abnormal behavior of pipeline 141. Security module 165 comprise a pipeline model window, a pipeline activity window, and an anomalous activity window. The pipeline model window may comprise one or more visual elements that depict statistical model for the normal operating state of pipeline 141. The pipeline activity window may comprise one or more visual elements that depict current operations (e.g., inputs/outputs) of pipeline 141. The anomalous activity window may comprise one or more visual elements that identifies actions performed by inputs received by, and outputs generated by pipeline 141 that model 163 has deemed anomalous. In other examples, that elements that comprise security module 165 may differ.

Programming environment 101, orchestration system 102, HMI 103, PLC 111, devices 131-133, pipeline 141, model 151, repository 162, and user interface 164 communicate over various communication links using communication technologies like industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Programming environment 101, orchestration system 102, HMI 103, PLC 111, devices 131-133, pipeline 141, model 151, repository 162, and user interface 164 comprise microprocessors, software, memories, transceivers, bus circuitry, and the like. The microprocessors comprise Central Processing Units (CPUs), Graphical Processing Units (GPUs), Digital Signal Processors (DSPs), Application-Specific Integrated Circuits (ASICs), Field Programmable Gate Arrays (FPGAs), and/or the like. The memories comprise Random Access Memory (RAM), flash circuitry, Hard Disk Drives (HDDs), Solid State Drives (SSDs), Non-Volatile Memory Express (NVMe) SSDs, and/or the like. The memories store software like operating systems, user applications, networking applications, control applications, security applications, machine learning applications, machine learning algorithms, and the like. The microprocessors retrieve the software from the memories and execute the software to drive the operation of industrial automation environment 100 as described herein.

Figure 2:
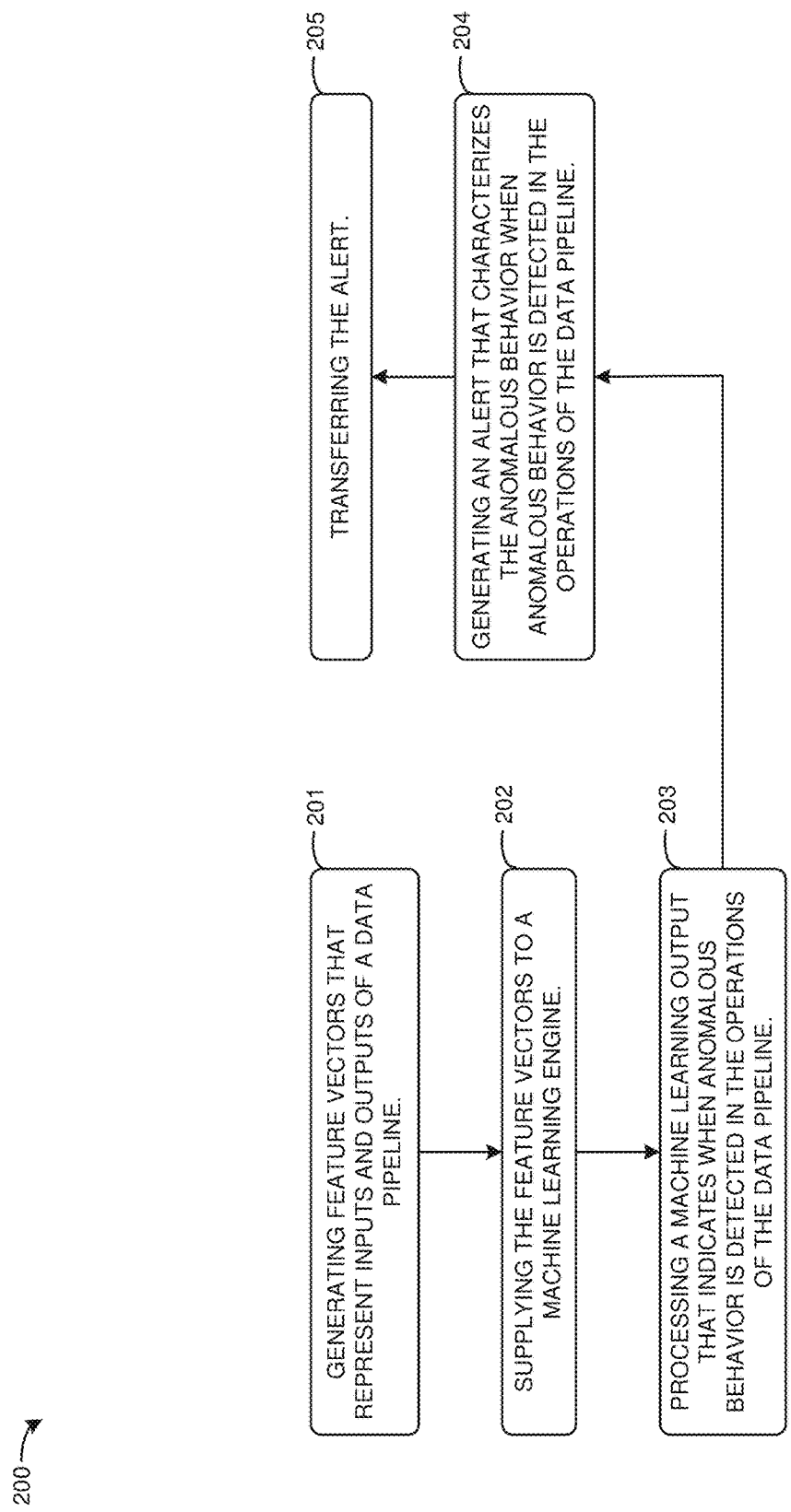
FIG. 2 illustrates an exemplary operation of an industrial automation environment to detect malicious behavior in a data pipeline of the industrial automation environment.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a malicious behavior detection process for a data pipeline of the industrial automation environment. Program 200 may be implemented in program instructions in the context of any of the software applications, module components, machine learning components, or other such elements of one or more computing devices. The program instructions direct the computing device(s) to operate as follows, referred to in the singular for the sake of clarity.

In operation, process 200 begins by generating feature vectors that represent inputs and outputs of a data pipeline (step 201). The operation continues by supplying the feature vectors to a machine learning engine (step 202). The operation continues by processing a machine learning output that indicates when anomalous behavior is detected in the operations of the data pipeline (step 203). The operation continues by, generating an alert that characterizes the anomalous behavior when anomalous behavior is detected in the operations of the PLC (step 204). The operation continues by transferring the alert (step 205).

Referring back to FIG. 1, industrial automation environment 100 includes a brief example of process 200 as employed by one or more applications hosted by the various computing devices comprising industrial automation environment 100.

In operation, a design application hosted by computing device in programming environment 101 generates a control program that is configured for implementation by PLC 111. For example, the design application may receive user inputs via a user interface and responsively generate a control program based on the user inputs. The user inputs may comprise clicks, drag-and-drop actions, touch screen inputs, keyboard inputs, and the like. The control program comprises a set of program tags. The program tags comprise control code that drive the operation of industrial process 121. Programming environment 101 uploads the control program to PLC 111. Orchestration system 102 directs PLC 111 to implement the control program received from programming environment 101. In response to the upload of the program and the direction by orchestration system 103, PLC 111 executes the control program. PLC 111 generates control signaling based on the execution of the control program and transfers the control signaling to industrial devices 131-133 to implement process 121. Industrial devices 131-133 operate in response to the control signaling and generate process data that characterizes their operations. For example, the operational data may comprise metrics like operating speed, operating temperature, units consumed, units produced, and the like. Industrial devices transfer the operational data to PLC 111. PLC 111 receives inputs from HMI 103 that tune the control operations of PLC 111 based on the operational data generated by industrial devices 131-133.

PLC 111 calls data pipeline 141 to ingest the operational data generated by industrial devices 131-133 while implementing industrial process 121. For example, PLC 111 may call an API in data pipeline 141 to ingest and transfer the operational data for delivery to machine learning model 151 to generate machine learning feedback for environment 100. Data pipeline 141 accepts the call and PLC 111 transfers the operational data to pipeline 141. Data pipeline 141 ingests the operational data as inputs, configures the operational data for ingestion by model 151, and transfers data outputs comprising the configured operational data to model 151. Model 151 ingests the operational data and generates machine learning feedback for industrial operation environment 100. The configuration of the operational data by pipeline 141 may comprise a reformatting of the operational data, a feature extraction process, a data schema implementation, or some other type of data processing operation. Data pipeline 141 calls security environment 161 to ingest inputs received by data pipeline 141, outputs generated by the data pipeline, and/or other types of information that characterizes the operations of data pipeline 141. The other types of information may comprise the sources of data ingestion requests, the time/date of data ingestion requests, plant personnel that initiated the ingestion requests, volume of data ingested/emitted by pipeline 141, and the like. By calling security environment 161, data pipeline 141 provides information to inhibit anomalous and malicious activity in data pipeline 141.

Security environment 161 receives the data inputs, data outputs, and other types of information that characterizes the operations of data pipeline 141. Security module 165 generates feature vectors that represent inputs, outputs, and operations of data pipeline 141 based on the information received from data pipeline 141 (step 201). The feature vectors comprise sets of numeric values that represent the inputs, outputs, and other information that are ingestible by a machine learning model. For example, security module 165 may run a feature extraction process of the data inputs ingested by pipeline 141 to generate derivative values that represent the data inputs and may group the derivative values together to form the feature vectors. Security module 165 supplies the feature vectors to machine learning model repository 162 (step 202).

Machine learning model 163 ingests the feature vectors generated by security module 165. Machine learning model 163 utilizes its constituent machine learning algorithms to process the feature vectors and generate a machine learning output. The machine learning output comprises an indication as to whether the current operations of pipeline 141 differ substantially from normal operation behavior. For example, the output may indicate that the API of data pipeline 141 received a request to ingest data from plant personnel at an unusual time of day. It should be appreciated that the type of anomalous/malicious behavior detected by model 163 is not limited and depends in part on the normal operations of pipeline 141. For instance, in one example model 163 may mark the data volume ingested by pipeline 141 as anomalous while in another example, model 163 may mark that same data volume ingested by pipeline 141 as normal.

Machine learning model repository 162 transfers the machine learning output to security module 165. Security module 165 processes the machine learning output that indicates when anomalous behavior is detected in the operations of pipeline 141 (step 203). For example, security module 165 may apply a threshold, white/blacklist, or some other type of security indicator to the machine learning output to determine the anomalous behavior data pipelines. Alternatively, the machine learning output may identify the anomalous behavior in pipeline 141 without additional processing from security module 165.

When anomalous behavior is detected in the operations of pipeline 141, security module 165 generates an alert that characterizes the anomalous behavior (step 204). For example, security module 165 may present the alert on user interface 164 in the anomalous activity window that indicates the format of data inputs received by pipeline 141 is abnormal. Security module 165 transfers the alert to other systems in industrial automation environment 100 (step 205). By transferring the alert, security module 165 can drive the other systems in environment 100 to respond to anomalous and malicious behavior. For example, security module 165 may have received a machine learning output that indicates pipeline 141 generated an unexpected output based on the inputs pipeline 141 ingested. In response, security module 165 may transfer the alert to orchestration system 102 to diagnose the cause of the mismatched inputs and outputs.

Advantageously, industrial automation environment 100 effectively utilizes machine learning systems to improve the security of data pipelines. Moreover, security environment 161 employs machine learning model 163 to detect when anomalous and malicious behavior occurs in data pipeline 141.

Figure 3:
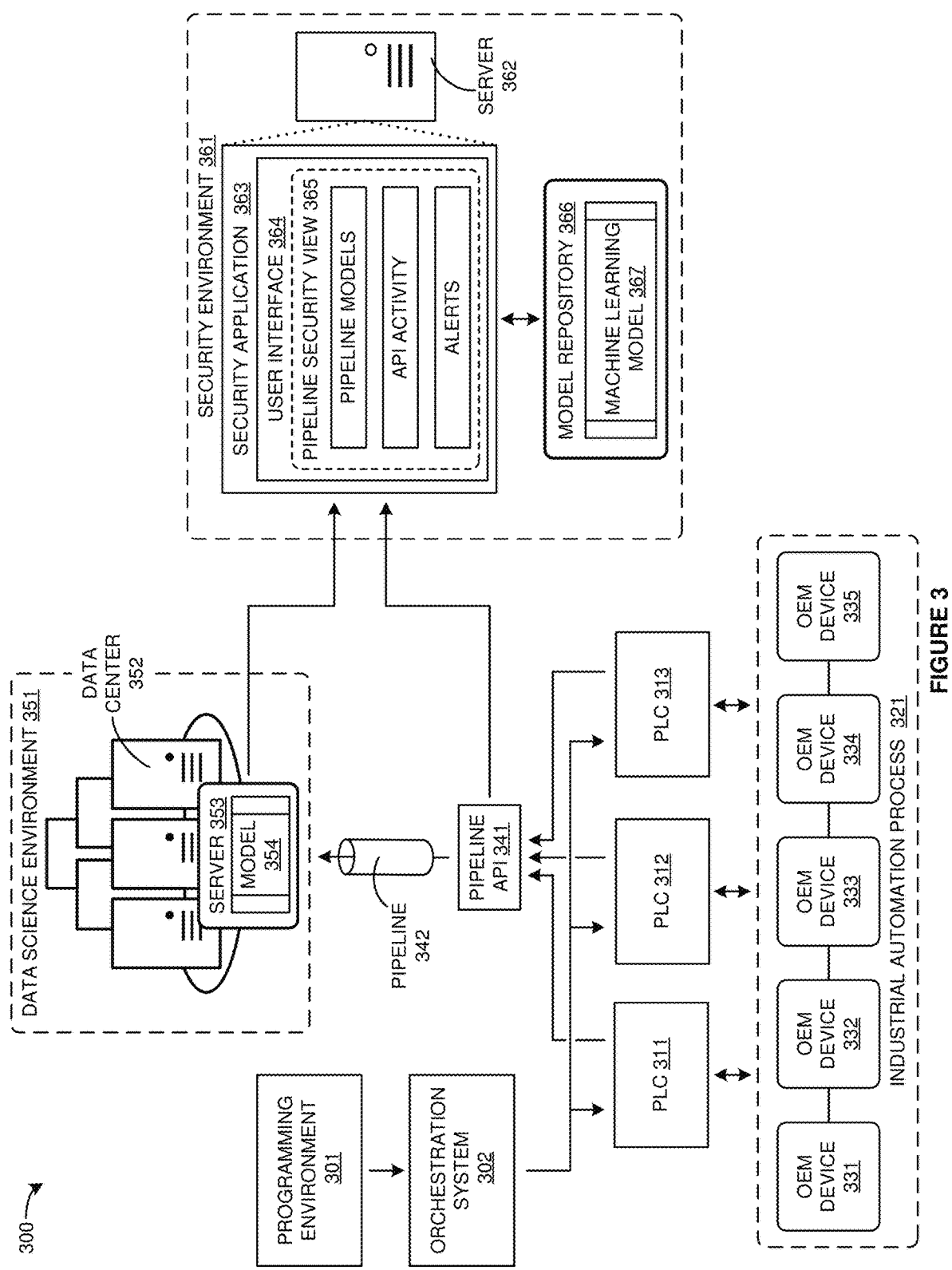
FIG. 3 illustrates an exemplary industrial automation environment to detect malicious behavior in a data pipeline of the industrial automation environment.

FIG. 3 illustrates industrial automation environment 300 to detect malicious behavior in a data pipeline. Industrial automation environment 300 comprises an example of industrial automation environment 100, however environment 100 may differ. Industrial automation environment 300 comprises programming environment 301, orchestration system 302, Programmable Logic Controllers (PLCs) 311-313, industrial automation process 321, Original Equipment Manufacturer (OEM) devices 331-335, pipeline Application Programming Interface (API) 341, data pipeline 142, data science environment 351, and security environment 361. Data science environment 351 comprises data center 352, server 353, and machine learning model 354. Security environment 361 comprises server 362, security application 363, user interface 364, pipeline security view 365, model repository 366, and machine learning model 367. Pipeline security view 365 comprises visual elements for pipeline models, API activity, and alerts.

Programming environment 301 is representative of one or more computing devices integrated into a network configured to generate control programs for industrial automation environment 300. The one or more computing device are configured to host an integrated design application configured to generate the control programs. The one or more computing devices comprise processors, bus circuitry, storage devices, software, and the like. The processors may comprise CPUs, GPUs, DSPs, ASICs, FPGAs, and the like. The storage devices comprise flash drives, RAM, HDDs, SSDs, NVMe SSDs, and the like. The storage devices store the software like the integrated design application. The processors may retrieve and execute software stored on the storage devices to drive the operation of the integrated design application. The integrated design application may be configured to receive user inputs via a user interface and generate a control program based on the user inputs and/or other types of inputs. Programming environment 301 may comprise user interface systems to facilitate the generation of control programs. The user interfaces may include one or more visual indicators relevant to control programs like visual code blocks, ladder logic, code chunks, functional block diagrams, and/or other types of visual indictors. Upon generation of a control program, the design application hosted by programming environment may transfer the control program to implement industrial automation process 321. For example, programming environment may utilize transceiver circuitry to upload control a program to PLCs 311-313 via industrial ethernet links.

Orchestration system 302 is representative of one or more computing devices integrated into a network configured to manage and coordinate the operation of PLCs 311-313. Orchestration system 302 hosts one or more industrial management applications configured to manage PLCs 311-313. The industrial management applications hosted by system 302 may receive control programs from programming environment 301 and distribute control programs to intended ones of PLCs 311-313. The industrial management applications may upload the identified programs to PLCs 311-313 and direct PLCs 311-313 when to activate the uploaded control program. The one or more computing devices of orchestration system 302 comprise processors, bus circuitry, storage devices, software, and the like. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of orchestration system 302.

PLCs 311-313 comprise one or more computing devices configured to receive and execute control programs to generate control signaling for OEM devices 331-335. PLCs 311-313 control the automated and coordinated operation of industrial process 321. PLCs 311-313 may implement control programs that may be designed using any number of programming tools in an integrated design environment such as text-based coding, functional block diagrams, ladder logic, graphics-based programming, or other types of programming interfaces. The control program may be designed or programmed on a design computer running an integrated design environment, then transmitted or uploaded to PLCs 311-313. Alternatively, the control program may be implemented with a system of hardware connections in PLCs 311-313 or in programmable PLC modules by which a PLC can be upgraded to add more control capacity as its industrial automation process grows in sophistication.

PLCs 311-313 control OEM devices 331-335 by sending the control signaling over one or more data channels that support synchronous or asynchronous communications to implement industrial automation process 321. Industrial automation process 321 may comprises a process for manufacturing goods but may also comprise processes occurring within a utility plant (e.g., an electrical power plant), research or laboratory facility (e.g., a sample testing or processing facility), processes occurring within a food processing facility (e.g., a cattle processing plant), or any other suitable industrial automated environment. OEM devices 331-335 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes.

PLCs 311-313 comprises one or more computing devices. The one or more computing devices of PLCs 311-313 comprise processors, bus circuitry, storage devices, software, and the like. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of PLCs 311-313. In some examples, PLCs 311-313 comprise Human Machine Interface (HMI) components configured to illustrate the operating conditions of PLCs 311-313 and receive user inputs to affect the operations of PLCs 311-313. The HMI components may receive user inputs from plant operators that comprise control commands for PLCs 311-313 to affect the operating states of OEM devices 331-335. The HMI components may comprise computers, mobile devices, kiosks, touchscreen devices, faceplates, or other types of computing device capable of performing the functions described herein.

Industrial automation process 321 is representative of a manufacturing process, chemical production process, food processing process, or any other type of industrial process. Although industrial automation process 321 is depicted with five OEM devices, in other examples automated systems may comprise a different number of OEM devices. OEM devices 331-335 may comprise devices like pumps, compressors, heat exchanges, centrifuges, mills, conveyers, filters, and the like. OEM devices 331-335 may comprise subcomponents (not illustrated for clarity) like motors, valves, electrical circuitry, processing circuitry, storage circuitry, transceivers, machined parts, and the like.

OEM devices 331-335 are coupled to PLCs 311-313. PLCs 311-313 transfer control signaling generated by the execution of a control program to OEM devices 331-335 to implement industrial automation process 321. OEM devices 331-335 receive their respective control signaling and operate according to the instructions. For example, OEM device 351 may comprise an electric motor to drive a pump. PLC 311 may execute the control program and determine a electric current level to power the electric motor at to achieve a desired pressure differential in the pump. PLC 311 may transfer control signaling to the motor in OEM device 351. Actuators in the motor of OEM device 351 may receive the control signaling and apply the indicated current level to achieve the necessary power level for the electric motor to drive the motor at the speed necessary to achieve the desired pressure differential.

As OEM devices 331-335 operate based on control signaling received from PLCs 311-313, they generate operational data that characterizes their operations. The operational data indicates the status of variables, operations, and/or processes of OEM devices 331-335. OEM devices 331-335 report their operational data to PLCs 311-313. For example, OEM 352 may comprise a ball mill and may report its rotations per minute to PLCS 311-313 as operational data.

Data pipeline API 341 is representative of an interface system to receive calls to ingest data for data pipeline 342. When pipeline API 341 receives a call to ingest data, API 341 reports the call to security environment 361. The reports comprise inputs received by data pipeline 141, the sources of data ingestion requests, the time/date of data ingestion requests, plant personnel the initiated the ingestion requests, volume of data ingested by pipeline 141, and the like. For example, PLC 311 may receive operational data from OEM device 331 and call API 341 to ingest the operational data. API 341 may accept the call and consume the operational data. In response, API 341 may transfer a report to security environment indicating the operational data was generated by OEM device 331, that the call was received from PLC 311, the amount of operational data to be ingested, and the time and date the request was received from PLC 311.

Data pipeline 342 comprises a data transfer system that communicatively couples PLCs 311-313 through API 341 with data science environment 351. Data pipelines 342 each individually comprise a set data processing elements connected in series. The data processing elements of data pipeline 342 comprise processors, bus circuitry, storage devices, software, and the like. The processors may comprise CPUs, GPUs, ASICs, and the like. The storage devices comprise flash drives, RAM, HDDs, SSDs, NVMe SSDs, and the like. The storage devices store the software. The processors may retrieve and execute software stored on the storage devices to drive the operation of data pipeline 342. Data pipeline 342 may transfer operational data generated by OEM devices 331-335 from PLCs 311-335 for delivery to machine learning model 354. Data pipeline 342 may perform processing operations on the data prior to reception by machine learning model 354. For example, data pipeline 342 may receive raw process data, implement a feature extraction process on process data to generate feature vectors that represent the process data, and transfer the feature vectors to server 353 for delivery to machine learning model 354.

Data science environment 351 is representative of a system to generate machine learning outputs to optimize, generate predictions, and provide feedback for industrial automation process 321. Data science environment 351 comprises data center 352. Data center 352 is representative of one or more computing devices integrated into a network to receive operational data from data pipeline 342. Examples of data center 352 may include server computers and data storage devices deployed on-premises, in the cloud, in a hybrid cloud, or elsewhere, by service providers such as enterprises, organizations, individuals, and the like. Data center 352 may rely on the physical connections provided by one or more other network providers such as transit network providers, Internet backbone providers, and the like to communicate with the other elements of environment 300. Data center 352 comprises server computer 353 which hosts machine learning model 354.

Server computer 353 comprises processors, bus circuitry, storage devices, software, and the like configured to host machine learning model 354. The processors may comprise CPUs, GPUs, ASICs, and the like. The storage devices comprise flash drives, RAM, HDDs, SSDs, NVMe SSDs, and the like. The storage devices store the software to host model 354. The processors may retrieve and execute software stored on the storage devices to drive the operation of machine learning model 354. Machine learning model 354 comprises one or more machine learning algorithms that are trained receive operational data generated by OEM devices 331-335 from data pipeline 342 to provide machine learning feedback to improve or otherwise affect the operation of process 321. Machine learning model 354 may employ one or more machine learning algorithms through which data can be analyzed to identify patterns, make decisions, make predictions, or similarly produce output that can inform control code and/or parameters for controlling process 321. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data.

In some examples, when server 353 receives a data output comprising operational data for model 354 from pipeline 342, server 353 transfers reports characterizing the data output to security environment 361. The reports comprise information like operational data type, time/date the out was received, volume of data received in the output, and the like. For example, pipeline 342 may transfer a data output comprising operational data generated by OEM device 334. In response to receiving the output, server 353 may transfer a report to security environment 361 indicating the output comprised operational data associated with device 334, the amount of operational data received, and the time and date server 353 ingested the data.

Security environment 361 comprises server 362. Server 362 is representative of one or more computing devices integrated into a network that communicates with programming pipeline API 342, server 353, and model repository 366. Examples of server 362 may include server computers and data storage devices deployed on-premises, in the cloud, in a hybrid cloud, or elsewhere, by service providers such as enterprises, organizations, individuals, and the like. Server 362 may rely on the physical connections provided by one or more other network providers such as transit network providers, Internet backbone providers, and the like for communication purposes. Server 362 is configured to host security application 363 which comprises user interface 364 and pipeline security view 365. Server 362 comprises processors, bus circuitry, storage devices, software, and the like configured to host security application 363. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of security application 363.

Security application 363 is representative of one or more applications configured to monitor the operations of pipeline 342, to detect malicious activity, and to present the identified malicious activity to human operators via a user interface. Security application 363 may receive reports from server 353 and API 341 that indicates the inputs, outputs, and behavior of pipeline 342. For example, the reports may indicate the types of operational data received by API 341, the source of the received requests, the time/date API 341 received the requests, the types of operational data received by server 353, the time/date server 353 received the operational data and/or other types of information that indicates the operations and external interactions of pipeline 342. Security application 363 may perform a feature extraction process to format the reports for ingestions by machine learning model 367. Upon generation of the feature vectors, security application 363 may transfer the feature vectors for delivery to machine learning model 367.

Security application 364 comprises user interface 364. User interface 364 comprise an on-screen display and may be displayed using a computer, a mobile device, a kiosk, a touchscreen device, or some other type of computing device capable of performing the user interface functions described herein. User interface 364 comprises pipeline security view 365. Pipeline security view 365 is representative of one of more visual elements on user interface 365 that communicate to a user normal operating behavior of data pipeline 342, current activity occurring on pipeline API 341, alerts indicating anomalous behavior observed in pipeline 342, and/or other information regarding the security of pipeline 342. In this example, pipeline security view 365 comprise visual elements for pipeline models, API activity, and alerts, however it should be appreciated pipeline security view 365 may comprise different visual elements in other examples. Pipeline security view 365 may comprise one or more user selectable options to respond to the detection of anomalous behavior in data pipeline 342. The responses may comprise the generation and transfer of alerts/notifications, pipeline deactivation, blocking API communication with external systems, and/or other types of pipeline security related operations. In some examples, security application 363 receives user inputs via the user selectable options on pipeline security view 365 and may operate according to the user selection (e.g., transferring a message to diagnose a detected anomaly in pipeline 342).

Model repository 366 is representative of one or more computing devices configured to implement machine learning model 367. The one or more computing devices of repository 366 comprises processors, bus circuitry, storage devices, software, and the like configured to machine learning model 367. The processors may comprise CPUs, GPUs, DSPs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of machine learning model 367.

Machine learning model 367 comprises one or more machine learning algorithms that are trained to identify anomalous behavior and malicious activity in pipeline 342. Machine learning model 367 employs one or more machine learning algorithms through which data can be analyzed to identify patterns, make decisions, make predictions, or similarly produce output that can determine the presence of anomalous and/or malicious activity in pipeline 342. For example, machine learning model 367 may employ a machine learning algorithm to detect when pipeline API 341 receives a malicious request to ingest data for pipeline 342. Examples of machine learning algorithms that may be employed solely or in conjunction with one another include neural network auto encoders and unsupervised anomaly detection algorithms. Other examples of suitable machine learning algorithms include artificial neural networks, nearest neighbor methods, ensemble random forests, support vector machines, naïve Bayes methods, linear regressions, or other types of machine learning algorithms that predict output data based on input data. Machine learning model 367 may utilize supervised learning methods, unsupervised learning methods, and/or reinforcement learning methods to train itself. The training data for model 367 may comprise feature vectors that comprise numeric representations of normal pipeline operations. Machine learning model 367 utilize the training data to construct a statistical model representation of pipeline 342 and compare the model representations to current pipeline behavior to generate a machine learning outputs to indicate when anomalous or malicious behavior occurs.

Figure 4:
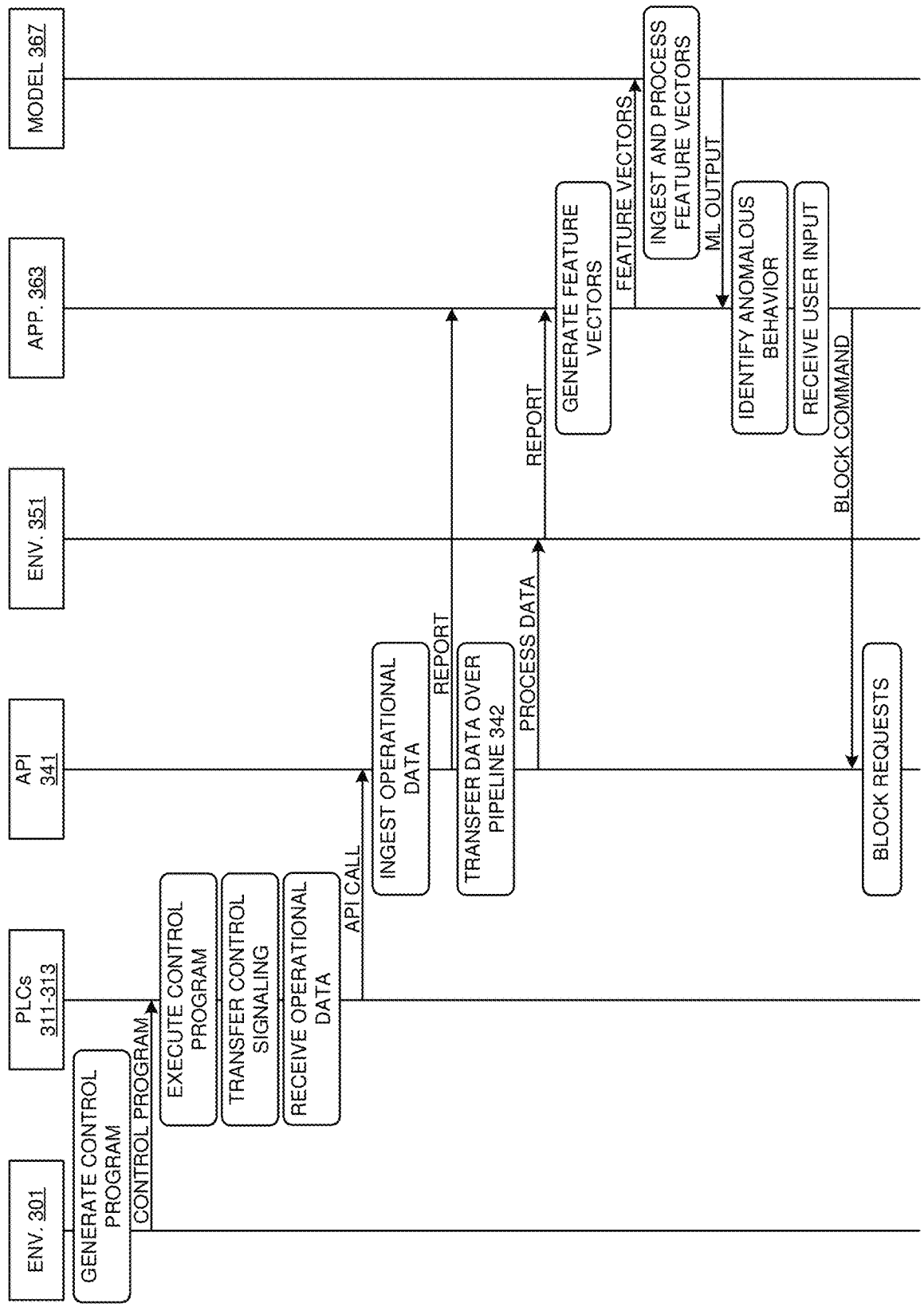
FIG. 4 illustrates an exemplary operation of an industrial automation environment to detect malicious behavior in a data pipeline the industrial automation environment.

FIG. 4 illustrates an exemplary operation of industrial automation environment 300 to detect malicious behavior in a data pipeline. The operation depicted by FIG. 4 comprises an example of process 200 illustrated in FIG. 2, however process 200 may differ. In other examples, the structure and operation of industrial automation environment 300 may be different.

In operation, programming environment 301 generates a control program. The control program is configured for execution by PLCs 311-313 to drive the operation of OEM devices 331-335. For example, a design application hosted in programming environment may receive a series of drag-and-drop user inputs via a user interface to construct the control program. Programming environment 301 transfers the control program to orchestration system (ORCH.) 302. Orchestration system 302 distributes the control program to PLCs 311-313 and coordinates the operation of PLCs 311-313. For example, orchestration system 302 may coordinate the operation of PLCs 311-313 based on a user generated operating schedule.

PLCs 311-313 receive the control program and direction from orchestration system 302 to implement the control program. For example, orchestration system 302 may direct PLCs 311-313 when to implement the control program via an industrial ethernet link. PLCs 311-313 executes the control program and transfers corresponding control signaling to OEM devices 331-335 to implement industrial process 321. For example, OEM device 351 may comprise a heat exchanger and a program tag of the control program may dictate a temperature differential setting for OEM 353. PLC 322 may execute the program tag and determine a valve setting to achieve a cold-water flow rate that results in the desired temperature differential. PLC 322 may transfer control signaling based on the execution to OEM device 353. In response, OEM device 353 may activate valve actuators and set the valve to the position indicated by the control signaling. OEM devices 331-335 of industrial automation process 321 receive the control signaling from PLCs 311-313. OEM devices 331-335 implement industrial automation process 321 as dictated by the control signaling generated by the execution of the control program. OEM devices 331-335 generate operational data based on their operations and transfer the process data to PLCs 311-313.

PLCs 311-313 transfer a call to API 341 to ingest the operational data generated by OEM devices 331-335. API 341 accepts the call from PLCs 311-313 and responsively ingests the operational data. API 341 generates a security report that comprises the received requests, the source of the requests, and/or other security related information characterizing the request. API 341 transfers the security report for delivery to security application 363. API 341 transfer the operational data to data science environment 351 over data pipeline 342. Server 353 in environment 351 receives a pipeline output from pipeline 342 comprising the operational data. In response to receiving the output, server 353 generates and transfers a security report for delivery to security application 363 that comprises the received output and/or other security related information characterizing the pipeline output.

In response to receiving the security reports from pipeline API 341 and server 353, security application 363 executes a feature extraction process on the reports to generate feature vectors that represent the information comprising the reports. For example, security application 363 may generate feature vectors to represent data inputs ingested by API 341 and the outputs received by server 353. Security application 363 uploads the feature vectors to model repository 366. Machine learning model 367 ingests and processes the feature vectors received by repository 366. Machine learning model 367 generates a machine learning output that indicates existence of anomalous behavior in pipeline 342. The anomalous behavior may indicate a mistake made in the processing and transfer operations of pipeline 342. For example, an error may occur in pipeline 342 and pipeline 342 may generate an output that does not match its corresponding input. Alternatively, the anomalous behavior may indicate malicious activity. For example, model 367 may process the feature vectors using its machine learning algorithms and determine that pipeline API 341 received a request to ingest malicious software that adversely affects the operations of pipeline 342. Model 367 transfers the machine learning output for delivery to security application 363. In this example, the machine learning output indicates API 341 received a data ingestion request from an unknown source.

Security application 363 receives the machine learning output and identifies the anomalous behavior in pipeline 342 based on the machine learning output. Security application 363 displays the identified anomalous behavior in pipeline security view 365 via user interface 364. Security application 363 receives user inputs via user interface 364 that drive security application 363 to transfer a block command to API 341. Security application 363 transfers the block command to API 341. API 341 receives the block command and responsively blocks requests from the unknown source identified in the machine learning output.

Figure 5:
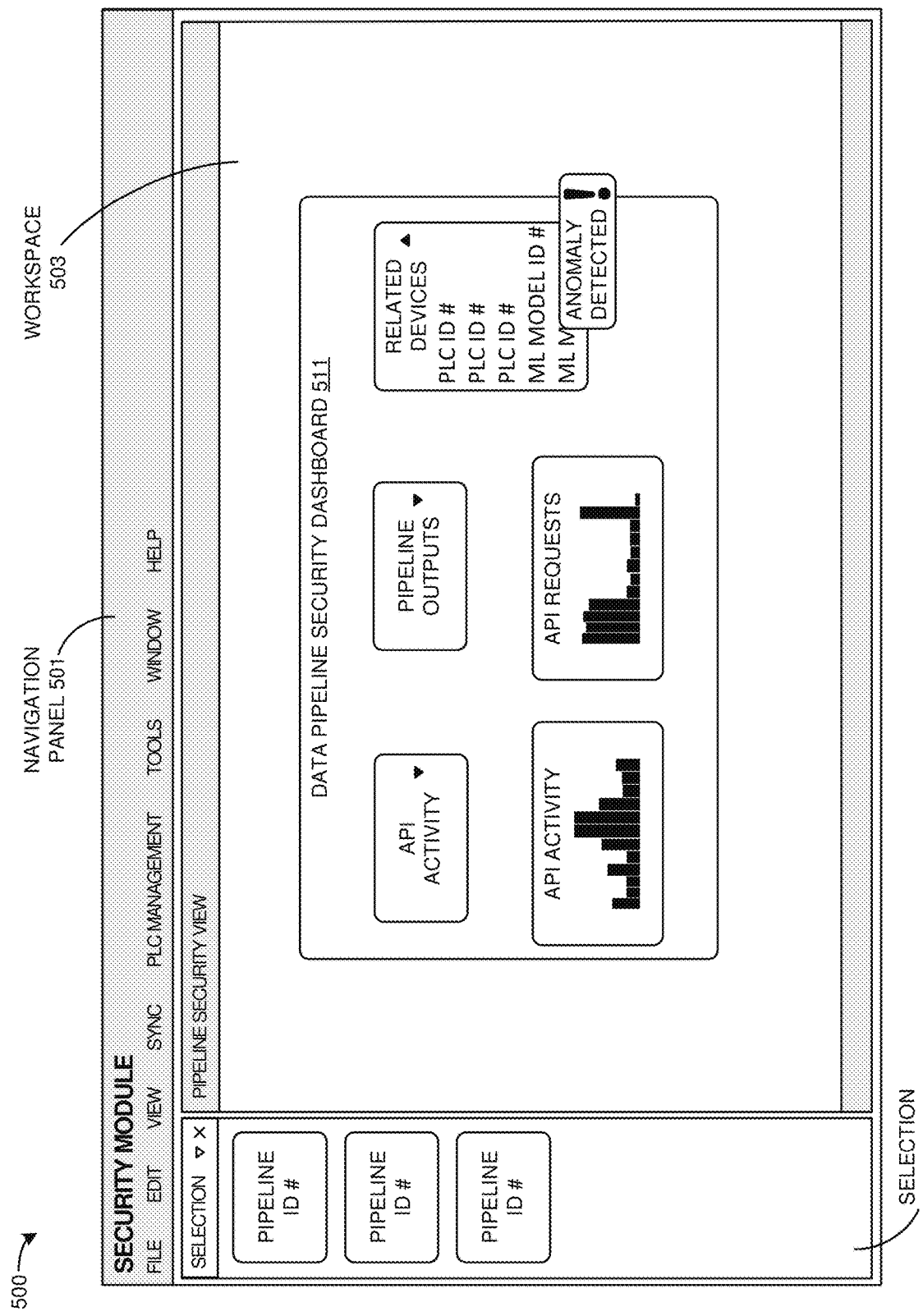
FIG. 5 illustrates an exemplary user interface in the industrial automation environment.

FIG. 5 illustrates user interface 500 to detect malicious behavior in a data pipeline. User interface 500 comprises an example of user interface 164 and user interface 364, however user interface 164 and user interface 364 may differ. User interface 500 comprises a security application presented on a display screen which is representative of any user interface for detecting malicious and/or anomalous behavior in a data pipeline. For example, user interface 500 may comprise a GUI configured to allow a user to interact with a security application and corresponding machine learning system to identify and respond to the detection of malicious activity in a data pipeline.

User interface 500 includes navigation panel 501 that allows a user to access the various features available through user interface. Navigation panel 501 comprises tabs like file, edit, view, library management, tools, window, and help. In other examples, navigation panel 501 may comprise fewer tabs, more tabs, and/or different types of tabs. A user may select a tab to access the functionality of the tab. Upon selection, the tabs may open drop down menus that list their functionality. For example, a user may select the file tab and select an option from a drop-down menu to save a project to memory. Navigation panel 501 is located on a top portion of user interface 500 however navigation panel 501 may be located on a different portion of user interface 500. For example, navigation panel 501 may be located on the bottom portion of user interface 500.

User interface 500 incudes selection panel 502. Selection panel 502 comprises a device selection system that allows a user to select data pipelines and view a corresponding security view for the selected data pipeline. In this example, selection panel 502 comprise three selectable data pipeline icons. The selectable pipeline icons comprise ID numbers that indicate which data pipeline system the icons correspond to. In other examples, selection panel 502 may comprise a different number of pipeline icons and the pipeline icons may include additional or different information. For example, the pipeline icons may indicate network and physical locations, active/inactive status, and the like. Selection panel 502 is located on a left portion of user interface 500 however selection panel 502 may be located on a different portion of user interface 500. For example, selection panel 502 may be located on the right portion of user interface 500.

User interface 500 includes workspace 503. Workspace 503 is representative of an interface that allows a human operator to view the security status of data pipelines within an industrial automation environment. Workspace 503 comprises pipeline security dashboard 511. Pipeline security dashboard 511 is representative of a computing interface with user selectable options that allows a user to view the security status and related information of a data pipeline in an industrial automation environment. For example, a user may have selected one of the pipeline icons in pipeline selection panel 502 to assess the security status of the corresponding data pipeline system and user interface 500 may responsively present pipeline security dashboard 511 for that data pipeline system in workspace 503. Pipeline security dashboard 511 comprises user selectable options labeled API activity, pipeline outputs, and related devices. The user selectable options comprise drop-down menus that, in response to selection by a user, open to reveal their contents. In this example, a user has selected the Related Devices option to view PLC IDs and machine learning model IDs related to the selected data pipeline system. In other examples, a user may select the options for API activity and/or pipeline outputs to view their contents.

Pipeline security dashboard 511 comprises additional visual elements labeled API activity and API requests that provide graphical representations of the status of the pipeline system. For example, the visual element for API activity may graphically illustrate the data volume ingested by an API for the data pipeline system for over time. For example, the visual element for API requests may graphically illustrate the number/origin of requests to ingest data received by the API. In other examples, the visual element for API activity and/or the visual element for API requests may graphically illustrate other types of information related to the data pipeline.

In this example, the visual element for related devices is labeled with an alert notification labeled anomaly detected which indicates that an anomaly has been detected in the devices associated with the data pipeline requests. For example, a machine learning model operatively coupled to user interface 500 may have processed feature vectors representing the inputs, outputs, and operations of the data pipeline and generated a machine learning output that indicates an anomaly with the devices associated with the data pipeline has occurred. The anomaly may indicate the format of data input requests send by one of the devices may have changed. In response, user interface 500 may mark the visual indicator for related devices with the anomaly detected notification. A user may select the anomaly detected notification to address the detected anomaly. In other examples, user interface may mark a different element of pipeline security dashboard 511 with an anomaly detected notification.

Figure 6:
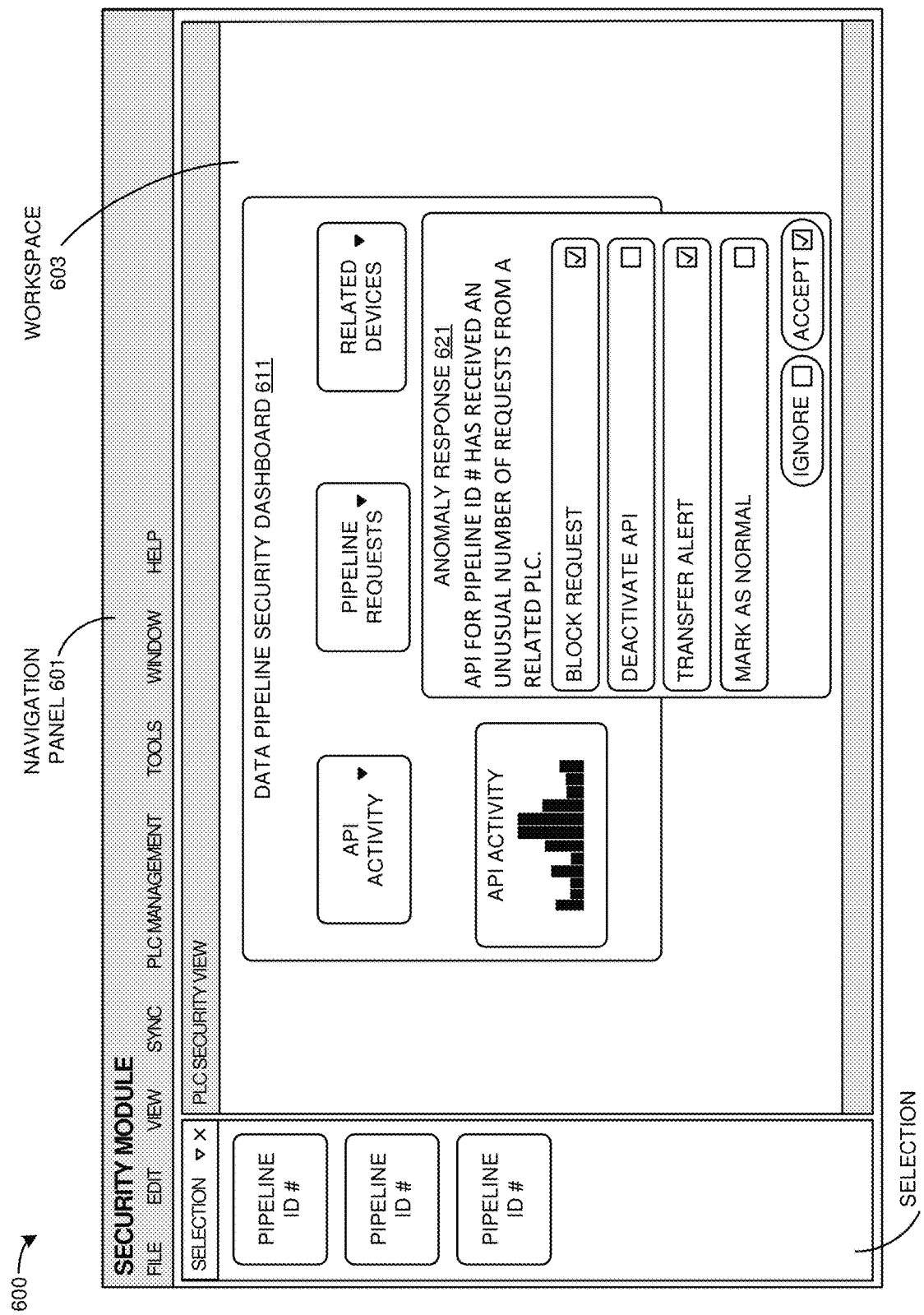
FIG. 6 illustrates an exemplary user interface in the industrial automation environment.

FIG. 6 illustrates user interface 600 to detect malicious behavior in a data pipeline. User interface 600 comprises an example of user interface 164 and user interface 364, however user interface 164 and user interface 364 may differ. User interface 600 comprises a security application presented on a display screen which is representative of any user interface for detecting malicious and/or anomalous behavior in a data pipeline system. For example, user interface 600 may be generated in response to the selection of the alert notification labeled anomaly detected as illustrated in FIG. 5.

User interface 600 includes navigation panel 601 that allows a user to access the various features available through user interface 600. Navigation panel 601 comprises tabs like file, edit, view, library management, tools, window, and help. In other examples, navigation panel 601 may comprise fewer tabs, more tabs, and/or different types of tabs. A user may select a tab to access the functionality of the tab. Upon selection, the tabs may open drop down menus that list their functionality. Navigation panel 601 is located on a top portion of user interface 600 however navigation panel 601 may be located on a different portion of user interface 600.

User interface 600 incudes selection panel 602. Selection panel 602 comprises a device selection system that allows a user to select data pipelines and view a corresponding security view for the selected data pipeline. In this example, selection panel 602 comprises three selectable pipeline icons. The selectable data pipeline icons comprise ID numbers that indicate which data pipeline systems the icons correspond to. Selection panel 602 is located on a left portion of user interface 600 however selection panel 602 may be located on a different portion of user interface 600.

User interface 600 includes workspace 603. Workspace 603 is representative of an interface that allows a human operator to view the security status of data pipelines within an industrial automation environment. Workspace 603 comprises pipeline security dashboard 611. Pipeline security dashboard 611 is representative a computing interface with user selectable options that allows a user to view the security status and related information of a data pipeline in an industrial automation environment. Pipeline security dashboard 611 comprises various textual and visual elements that depict the security state of a data pipeline. Overlaid on pipeline security dashboard 611 is anomaly response window 621. Anomaly response 621 comprises a set of user selectable options that allow a user to respond to the detection of an anomaly (e.g., malicious activity) in the data pipeline system that corresponds to pipeline security dashboard 611. For example, a user may have selected an anomaly detected notification (e.g., the anomaly detected notification illustrated in FIG. 5) and user interface may display anomaly response 621 in response to the selection.

In this example, anomaly response window 621 indicates a pipeline API has received an unusual number of requests from a related PLC device. For example, this may indicate a malicious entity is trying to spam the data pipeline system through the related PLC device. Alternatively, this may indicate a software bug in the related PLC device. Anomaly response 621 includes a set of user selectable options to block requests, deactivate the API, transfer an alert, and to mark the requests as normal. In other examples, anomaly response 621 may comprise different user selectable options to respond to the detected anomaly. In this example, a user has elected to block the requests and transfer an alert indicating the anomaly. Once a user has finalized their selections, they may select the option labeled accept to implement their selections. Alternatively, the user may select the option labeled ignore to close anomaly response window 621 without responding to the detected anomaly. In this example, the user has selected the accept button to implement their response. In response to the user selection of the accept button, the security application presented via user interface 600 implements the user selected response to detected anomaly.

Figure 7:
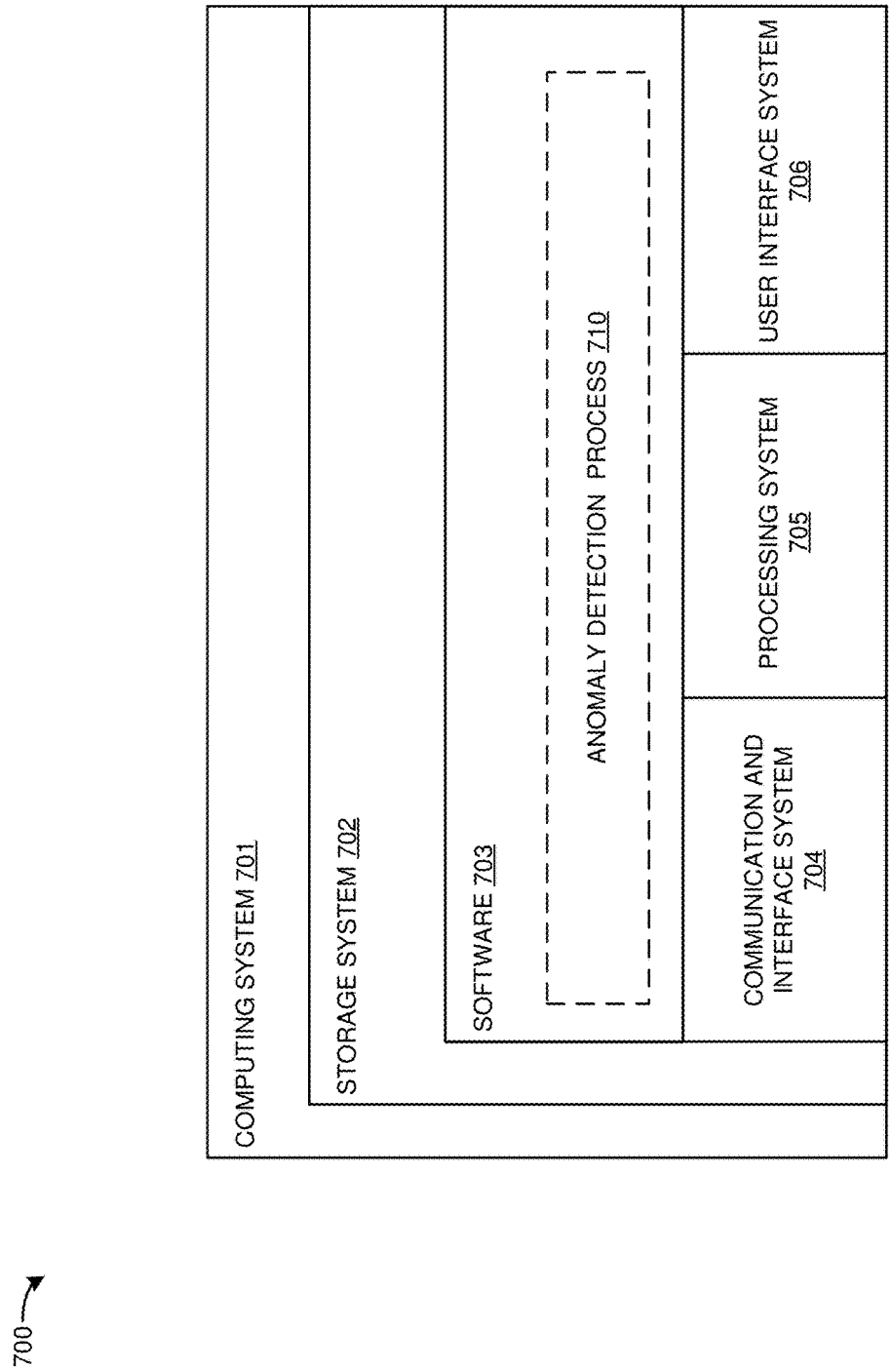
FIG. 7 illustrates an exemplary computing device that may be used in accordance with some embodiments of the present technology.

FIG. 7 illustrates computing system 701 according to an implementation of the present technology. Computing system 701 is representative of any system or collection of systems with which the various operational architectures, processes, scenarios, and sequences disclosed herein for detecting anomalous behavior in a data pipeline may be employed. For example, computing system 701 may be representative of programming environments 101 and 301, orchestration systems 102 and 301, PLCs 111 and 311-313, pipelines 141 and 342, pipeline API 341, model 151, security environment 161, data center 342, server 362, repository 366, and/or any other computing device contemplated herein. Computing system 701 may be implemented as a single apparatus, system, or device or may be implemented in a distributed manner as multiple apparatuses, systems, or devices. Computing system 701 includes, but is not limited to, storage system 702, software 703, communication interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements anomaly detection process 710, which is representative of any of the data pipeline anomaly detection processes discussed with respect to the preceding Figures, including but not limited to the industrial control, anomalous and malicious activity prevention, and user interface operations described with respect to the preceding Figures. For example, anomaly detection process 710 may be representative of process 200 illustrated in FIG. 2 and/or the exemplary operation of environment 300 illustrated in FIG. 4. When executed by processing system 705 to detect and prevent anomalous behavior in a data pipeline, software 703 directs processing system 705 to operate as described herein for at least the various processes, operational scenarios, and sequences discussed in the foregoing implementations. Computing system 701 may optionally include additional devices, features, or functionality not discussed for purposes of brevity.

Processing system 705 may comprise a micro-processor and other circuitry that retrieves and executes software 703 from storage system 702. Processing system 705 may be implemented within a single processing device but may also be distributed across multiple processing devices or subsystems that cooperate in executing program instructions. Examples of processing system 705 include general purpose CPUs, GPUs, DSPs, ASICs, FPGAs, and logic devices, as well as any other type of processing device, combinations, or variations thereof.

Storage system 702 may comprise any computer readable storage media readable by processing system 705 and capable of storing software 703. Storage system 702 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (including anomaly detection process 710) may be implemented in program instructions and among other functions may, when executed by processing system 705, direct processing system 705 to operate as described with respect to the various operational scenarios, sequences, and processes illustrated herein. For example, software 703 may include program instructions for generating feature vectors that represent the inputs and outputs of a data pipeline and identify anomalous behavior in the data pipeline based on a machine learning output as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to detect anomalous and malicious activity in a data pipeline and present identified anomalous and malicious activity on a user interface as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for anomaly detection in a data pipeline, it should be understood that the condition systems and methods described herein are not limited to such embodiments and may apply to a variety of other industrial automation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to detect malicious behavior in an industrial automation environment, the system comprising:
    a memory that stores executable components; and
    a processor, operatively coupled to the memory, that executes the executable components,
    the executable components comprising:
        a security component configured to generate feature vectors that represent inputs to a data pipeline and that represent outputs generated by the data pipeline, and supply the feature vectors to a machine learning engine, wherein the inputs comprise operational data that characterizes the operations of industrial devices in the industrial automation environment, the outputs comprise the operational data formatted for ingestion by a machine learning model trained to generate a machine learning output for the industrial automation environment based on the operational data, and the data pipeline performs one or more data processing operations on the inputs to generate the outputs;
        the security component configured to process the machine learning output that indicates when an anomalous behavior is detected in operations of the data pipeline; and
        when the anomalous behavior is detected in the operations of the data pipeline, the security component configured to generate and transfer an alert wherein the alert characterizes the anomalous behavior.

2. The system of claim 1 further comprising:
    the machine learning engine configured to ingest the feature vectors, process the feature vectors using its constituent machine learning algorithms, and generate the machine learning output.

3. The system of claim 1 further comprising:
    the security component configured to generate training feature vectors that represent a set of normal inputs to the data pipeline and normal outputs generated by the data pipeline and supply the training feature vectors to the machine learning engine; and
    the security component configured to receive a training output that comprises a statistical model of the data pipeline.

4. The system of claim 1 wherein the anomalous behavior comprises a format change to the inputs to the data pipeline.

5. The system of claim 1 wherein the anomalous behavior comprises a source change to inputs to the data pipeline.

6. The system of claim 1 wherein the machine learning engine comprises unsupervised anomaly detection algorithms.

7. The system of claim 1 wherein the machine learning engine comprises neural network auto-encoders.

8. A method to detect malicious behavior in an industrial automation environment, the method comprising:
    generating, by a system comprising a processor, feature vectors that represent inputs to a data pipeline and that represent outputs generated by the data pipeline, and supplying the feature vectors to a machine learning engine, wherein the inputs comprise operational data that characterizes the operations of industrial devices in the industrial automation environment, the outputs comprise the operational data formatted for ingestion by a machine learning model trained to generate a machine learning output for the industrial automation environment based on the operational data, and the data pipeline performs one or more data processing operations on the inputs to generate the outputs;

processing, by the system, the machine learning output that indicates when an anomalous behavior is detected in operations of the data pipeline; and when the anomalous behavior is detected in the operations of the data pipeline, generating and transferring, by the system, an alert wherein the alert characterizes the anomalous behavior.

9. The method of claim 8 further comprising:
ingesting, by the system, the feature vectors;
processing, by the system, the feature vectors using machine learning algorithms of the machine learning engine; and
generating, by the system, the machine learning output.

10. The method of claim 8 further comprising:
generating, by the system, training feature vectors that represent a set of normal inputs to the data pipeline and normal outputs generated by the data pipeline;
supplying, by the system, the training feature vectors to the machine learning engine; and
receiving, by the system, a training output that comprises a statistical model of the data pipeline.

11. The method of claim 8 wherein the anomalous behavior comprises a format change to the inputs to the data pipeline.

12. The method of claim 8 wherein the anomalous behavior comprises a source change to inputs to the data pipeline.

13. The method of claim 8 wherein the machine learning engine comprises unsupervised anomaly detection algorithms.

14. The method of claim 8 wherein the machine learning engine comprises neural network auto-encoders.

15. A non-transitory computer-readable medium stored thereon instructions to detect malicious behavior in an industrial automation environment that, in response to execution, cause a system comprising a processor to perform operations, the operations comprising:
generating feature vectors that represent inputs to a data pipeline and that represent outputs generated by the data pipeline, and supplying the feature vectors to a machine learning engine, wherein the inputs comprise operational data that characterizes the operations of industrial devices in the industrial automation environment, the outputs comprise the operational data formatted for ingestion by a machine learning model trained to generate a machine learning output for the industrial automation environment based on the operational data, and the data pipeline performs one or more data processing operations on the inputs to generate the outputs;

processing the machine learning output that indicates when an anomalous behavior is detected in operations of the data pipeline; and when the anomalous behavior is detected in the operations of the data pipeline, generating and transferring an alert wherein the alert characterizes the anomalous behavior.

16. The non-transitory computer-readable medium of claim 15, the operations further comprising:
ingesting the feature vectors;
processing the feature vectors using machine learning algorithms of the machine learning engine; and
generating the machine learning output.

17. The non-transitory computer-readable medium of claim 15, the operations further comprising:
generating training feature vectors that represent a set of normal inputs to the data pipeline and normal outputs generated by the data pipeline;
supplying the training feature vectors to the machine learning engine; and
receiving a training output that comprises a statistical model of the data pipeline.

18. The non-transitory computer-readable medium of claim 15 wherein the anomalous behavior comprises a format change and a source change to the inputs to the data pipeline.

19. The non-transitory computer-readable medium of claim 15 wherein the machine learning engine comprises unsupervised anomaly detection algorithms.

20. The non-transitory computer-readable medium of claim 15 wherein the machine learning engine comprises neural network auto-encoders.

* * * * *